UNITED STATES PATENT OFFICE 2,385,190

POLYMERIZATION OF CONJUGATED DIENE HYDROCARBONS

George L. Browning, Jr., Akron, Ohio, assignor, by mesne assignments, to The B. F. Goodrich Company, Akron, Ohio, a corporation of New York No Drawing. Application February 7, 1941,
Serial No. 377,837

9 Claims. (Cl. 260—84.5)

This invention relates to the polymerization of conjugated diene hydrocarbons and particularly to a method whereby conjugated diene hydrocarbons may be polymerized in an aqueous emulsion to form products closely resembling natural crude rubber.

The emulsion polymerization of conjugated diene hydrocarbons either alone or in admixture with other conjugated dienes or vinyl-type comonomers to form compositions of matter more or less resembling rubber is well known. It has been commonly observed, however, that the products of such polymerization often resemble vulcanized rubber rather than natural crude rubber in respect to solubility, plasticity, and processing characteristics. Thus, it has often been found that the polymers were insoluble in and, in some cases, not even swelled by benzene or acetone, and that they were tough, non-plastic materials which either would not homogenize on a mill or which were very difficult to mill and to subject to other ordinary processing operations for natural rubber.

I have now discovered that the tetra-alkyl thiuram sulfides in which the four alkyl groups contain a total of at least 12 carbon atoms modify the emulsion polymerization of conjugated dienes in such a manner that polymers more nearly resembling natural crude rubber are produced than when the polymerization is carried on in the absence of the materials of this invention. The action of these materials is surprising because the thiuram sulfides are accelerators of vulcanization, and many accelerators strongly inhibit the polymerization of conjugated dienes. Furthermore, the lower tetra-alkyl thiuram sulfides such as tetramethyl and tetraethyl thiuram mono- and disulfide inhibit the polymerization of conjugated diene hydrocarbons. The tetraisopropyl sulfides do not inhibit emulsion polymerization, however, and certain of the higher thiuram sulfides such as tetrabutyl thiuram disulfide accelerate the polymerization somewhat. Other materials which may be employed to modify polymerizations in accordance with the method of this invention include tetrapropyl thiuram monosulfide, tetrapropyl thiuram disulfide, tetra-act. amyl thiuram disulfide and mixed thiurams such as dipropyl dibutyl thiuram disulfide and diethyl dibutyl thiuram monosulfide. The term "sulfide" as used herein signifies both the mono- and polysulfides unless it is specifically limited by a prefix such as mono- or di-.

The effect of tetra-alkyl thiuram sulfides on polymerization reactions is shown by the copolymerization in aqueous emulsion at 30° C. of 75 parts by weight of butadiene and 25 parts of acrylonitrile. In the presence of .31 parts of tetramethyl thiuram disulfide, it took 153 hours to complete the polymerization. In the presence of .84 parts of tetrapropyl thiuram disulfide, however, the polymerization was complete in 60 hours, and in the presence of 1.01 parts of tetrabutyl thiuram disulfide, the polymerization was complete in 40 hours. The synthetic rubbers obtained by the coagulation of the latices obtained as products of the above polymerizations in the presence of thiuram disulfides were coherent, plastic materials having a much greater solubility in benzene than a polymer prepared in the absence of any modifier, and the vulcanizates prepared from the modified polymers exhibited an increased elongation. Similar results are observed when the thiuram sulfides of this invention are employed during the emulsion copolymerization of butadiene and methyl methacrylate.

While the above example is confined to the use of disulfides as modifiers, it will be clear to those skilled in the art that other polysulfides such as the corresponding tri- and tetrasulfides and the mono-sulfides may similarly be employed. The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of the polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber with the aid of sulfur change the properties of the crude rubber.

This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion in emulsion polymerization batches of a tetra-alkyl thiuram sulfide in which the alkyl groups contain a total of at least 12 carbon atoms produces the beneficial results heretofore described.

The modifying agents of this invention may be employed in the polymerization in aqueous emulsion of conjugated butadiene hydrocarbons such as butadiene (butadiene-1,3), 2,3-dimethylbutadiene, isoprene, or piperylene either alone or in admixture with each other or with monomers copolymerizable therewith. A number of materials which contain the group

wherein the free valences are attached to separate groups and which are believed to enter into polymeric chains only by 1,2-addition are known to be capable of copolymerizing with conjugated butadiene hydrocarbons. This class of monomers, herein called "vinyl-type monomers," includes such compounds as styrene, vinyl naphthalene, acrylonitrile, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These vinyl-type monomers are preferably, although not necessarily, employed in smaller amounts than the conjugated diene.

The polymerization of the above materials in aqueous emulsion may be effected by various initiators of polymerization such as per-compounds including hydrogen peroxide, ammonium persulfate, potassium persulfate, and other peracids, peroxides, and per-salts such as persulfates, perborates, percarbonates, and the like, as well as other types of initiators such as diazoaminobenzene, and dipotassium diazomethane disulfonate.

Any of the ordinary emulsifying agents such as fatty acid soaps including sodium oleate and sodium stearate, hymolal sulfates and sulfonates including sodium lauryl sulfate and sodium isopropyl naphthalene sulfonate, and salts of hymolal organic bases such as the hydrochloride of diethylaminoethyloleylamide, trimethylcetylammonium methyl sulfate, etc. may be employed.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing a conjugated butadiene hydrocarbon in an aqueous emulsion in the presence of a small amount of a tetra-alkyl thiuram sulfide in which the alkyl groups contain a total of at least 12 carbon atoms.

2. The method which comprises copolymerizing a conjugated butadiene hydrocarbon and a smaller amount of a monomer copolymerizable therewith in an aqueous emulsion in the presence of a small amount of a tetra-alkyl thiuram sulfide in which the alkyl groups contain a total of at least 12 carbon atoms.

3. The method which comprises copolymerizing a conjugated butadiene hydrocarbon and a smaller amount of a monomer copolymerizable therewith which contains a

group and polymerizes only by 1,2-addition, in an aqueous emulsion in the presence of a small amount of a tetra-alkyl thiuram disulfide in which the alkyl groups each contain 3 carbon atoms.

4. The method which comprises copolymerizing butadiene and a smaller amount of styrene in an aqueous emulsion in the presence of a tetra-alkyl thiuram sulfide in which the alkyl groups contain a total of at least 12 carbon atoms.

5. The method which comprises copolymerizing butadiene and a smaller amount of acrylonitrile in an aqueous emulsion in the presence of a tetra-alkyl thiuram sulfide in which the alkyl groups contain a total of at least 12 carbon atoms.

6. The method which comprises copolymerizing butadiene and a smaller amount of acrylonitrile in an aqueous emulsion in the presence of tetra-n-propyl thiuram disulfide.

7. The method which comprises copolymerizing butadiene and a smaller amount of acrylonitrile in an aqueous emulsion in the presence of tetraisopropyl thiuram disulfide.

8. The method which comprises copolymerizing butadiene and a smaller amount of methyl methacrylate in an aqueous emulsion in the presence of a tetra-alkyl thiuram sulfide in which the alkyl groups contain a total of at least 12 carbon atoms.

9. The method which comprises copolymerizing butadiene and a smaller amount of methyl methacrylate in an aqueous emulsion in the presence of a tetra-alkyl thiuram sulfide in which the alkyl groups each contain 3 carbon atoms.

GEORGE L. BROWNING, Jr.